United States Patent [19]

Snyder

[11] 4,183,588
[45] Jan. 15, 1980

[54] SKID CONTROL SYSTEM AND METHOD FOR AUTOMOTIVE VEHICLES

[75] Inventor: Robert C. Snyder, Country Club Hills, Ill.

[73] Assignee: Motor Wheel Corporation, Lansing, Mich.

[21] Appl. No.: 900,274

[22] Filed: Apr. 26, 1978

Related U.S. Application Data

[63] Continuation of Ser. No. 801,774, May 31, 1977, abandoned.

[51] Int. Cl.$^2$ .............................................. B60T 8/02
[52] U.S. Cl. .............................. 303/110; 188/181 A; 303/20; 303/97; 303/114
[58] Field of Search ................... 188/181 A; 244/111; 303/20, 91-111, 61, 114

[56] References Cited

U.S. PATENT DOCUMENTS

| | | | |
|---|---|---|---|
| 3,558,197 | 1/1971 | Lueck et al. | 303/61 UX |
| 3,637,264 | 1/1972 | Leiber et al. | 303/61 X |
| 3,653,725 | 4/1972 | Hayes et al. | 303/61 X |
| 3,794,389 | 2/1974 | Davis et al. | 303/106 |
| 3,880,474 | 4/1975 | Scharlack | 303/110 |
| 4,060,285 | 11/1977 | Jones | 303/106 |

*Primary Examiner*—Stephen G. Kunin
*Attorney, Agent, or Firm*—Barnes, Kisselle, Raisch & Choate

[57] ABSTRACT

A skid control system and method for use in conjunction with a vacuum-boosted hydraulic brake system of the type presently used in automotive passenger vehicles. The velocity of each monitored vehicle wheel is sensed and a signal indicative of wheel deceleration is derived. A skid control valve is connected to the vacuum booster of the brake system to vent the booster vacuum chamber to the atmosphere when an excessive wheel deceleration is detected at any one of the monitored wheels and thereby relieve brake pressure at all of the monitored wheels. When the wheel begins to speed back up to vehicle speed, the skid control valve is pulsed by a control signal having a predetermined frequency and having a duty cycle which increases a function of time over a predermined control period. In this manner, the brake pressure at the monitored wheels is gradually increased as a function of time until the brake pressure desired by the vehicle operator is again achieved.

17 Claims, 4 Drawing Figures

SKID CONTROL SYSTEM AND METHOD FOR AUTOMOTIVE VEHICLES

This is a continuation of application Ser. No. 801,774, filed May 31, 1977 (now abandoned).

The present invention relates to brake control methods and systems and, more particularly, to vehicle skid control methods and systems of the type in which brake pressure at a monitored wheel or wheels is regulated as a function of wheel performance.

A braked vehicle may enter a skid condition when one or more vehicle wheels contact a surface, such as gravel or ice, having a coefficient of friction different from the surface contacted by the remaining vehicle wheels. The low-coefficient wheel or wheels will lose angular velocity, and hence "slip" with respect to vehicle velocity at a rate greater than that of the high-coefficient wheels for a given braking force or brake torque. The drag force developed by each vehicle wheel varies as a function of wheel slip, which function is referred to in the braking arts as the mu-slip function, mu being the coefficient of friction between a wheel and the road surface. If has been recognized that maximum braking efficiency is obtained when each wheel slips at a rate of between fifteen and twenty percent as compared to the forward velocity of the vehicle. See, for example, U.S. Pat. Nos. 3,574,417 and 3,599,014. It has also been recognized generally that, beyond this fifteen to twenty percent operating range, the mu-slip function becomes highly unstable in that brake torque declines rapidly with increasing wheel slip. This rapidly declining torque tends, in turn, to further increase wheel slip so that, if the situation remains uncorrected, the wheel eventually locks up, i.e., has zero angular velocity. In this locked condition the wheel exerts almost no braking or drag force upon the road surface so that the entire brake drag force of the moving vehicle must be assumed by the remaining wheel or wheels. The resulting distribution of brake drag forces may be uneven and cause erratic motion of the vehicle, usually referred to as vehicle skid. For the usual automotive vehicle traveling at highway speeds, the amount of time required for a wheel to become unstable after passing the fifteen to twenty percent operating range is on the order of ten milliseconds.

In vacuum-boosted hydraulic brake systems of the type used in many automotive passenger vehicles, the brake system response time lag caused by cylinder or diaphragm movement in booster valves, etc. may be on the order of eighty to one hundred milliseconds. Various prior art skid control systems designed for use in vacuum-boosted hydraulic brake systems attempt to correct an impending wheel lock-up condition by correcting brake pressure at the slipping wheel at the moment an excessive slip condition is sensed. However, due to the eighty to one hundred millisecond response time lag of the brake system, the excessive slip condition cannot be corrected within the critical ten milliseconds so that wheel lock-up usually results.

It is an object of the present invention to provide a skid control method and system for automotive vehicles which so regulates the brake pressure at the vehicle wheels as to prevent the wheels from locking up, and thus prevent the vehicle from going into a skid condition.

It is another object of the present invention to provide an economical and reliable skid control method and system which are specifically designed for use with a vacuum-boosted hydraulic brake control system of the type used in automotive passenger vehicles.

In conjunction with the object stated immediately above, it is a further object of the present invention to provide a skid control method and system which realistically take into consideration and account for the inherent response time lag of the various brake system components.

In accordance with the present invention these and other objects are satisfied by providing a vehicle skid control method and system in which the velocity and deceleration of a selected vehicle wheel or wheels are monitored and brake pressure at the monitored wheels is relieved or "dumped" when an excessive wheel deceleration is detected as indicating an impending wheel lock-up. When the wheel begins to recover, i.e., speed back up to vehicle speed, the system brake pressure is gradually increased as a predetermined function of time until the desired brake pressure is again achieved.

More specifically, in the skid control method and system provided by the present invention a skid control valve is connected to the vacuum booster of a hydraulic brake system to vent the vacuum chamber to atmosphere when an excessive deceleration is detected, thereby relieving brake pressure at the monitored wheels. When the wheels begin to speed back up to vehicle speed, the skid control valve is pulsed by a control signal having a predetermined frequency and having a duty cycle which increases as a function of time over a selected control period. In this way, brake pressure at the monitored wheels is gradually increased as a function of time until the maximum brake pressure desired by the vehicle operator is again achieved. In a presently preferred embodiment of the invention, the frequency of the pulsed control signal is less than eleven hertz, and is preferably about eight hertz, so that the period of the control signal will be greater than the lag time of the hydraulic brake system. The duration of the control cycle, i.e., the time between the beginning of wheel recovery and the achievement of maximum desired brake pressure, is selected as a function of vehicle wheel size, and is preferably on the order of about two hundred fifty milliseconds for an average size automobile wheel.

The invention, together with additional objects, features and advantages thereof, will be best understood from the following description when read in conjunction with the accompanying drawings in which.

Figure 1:
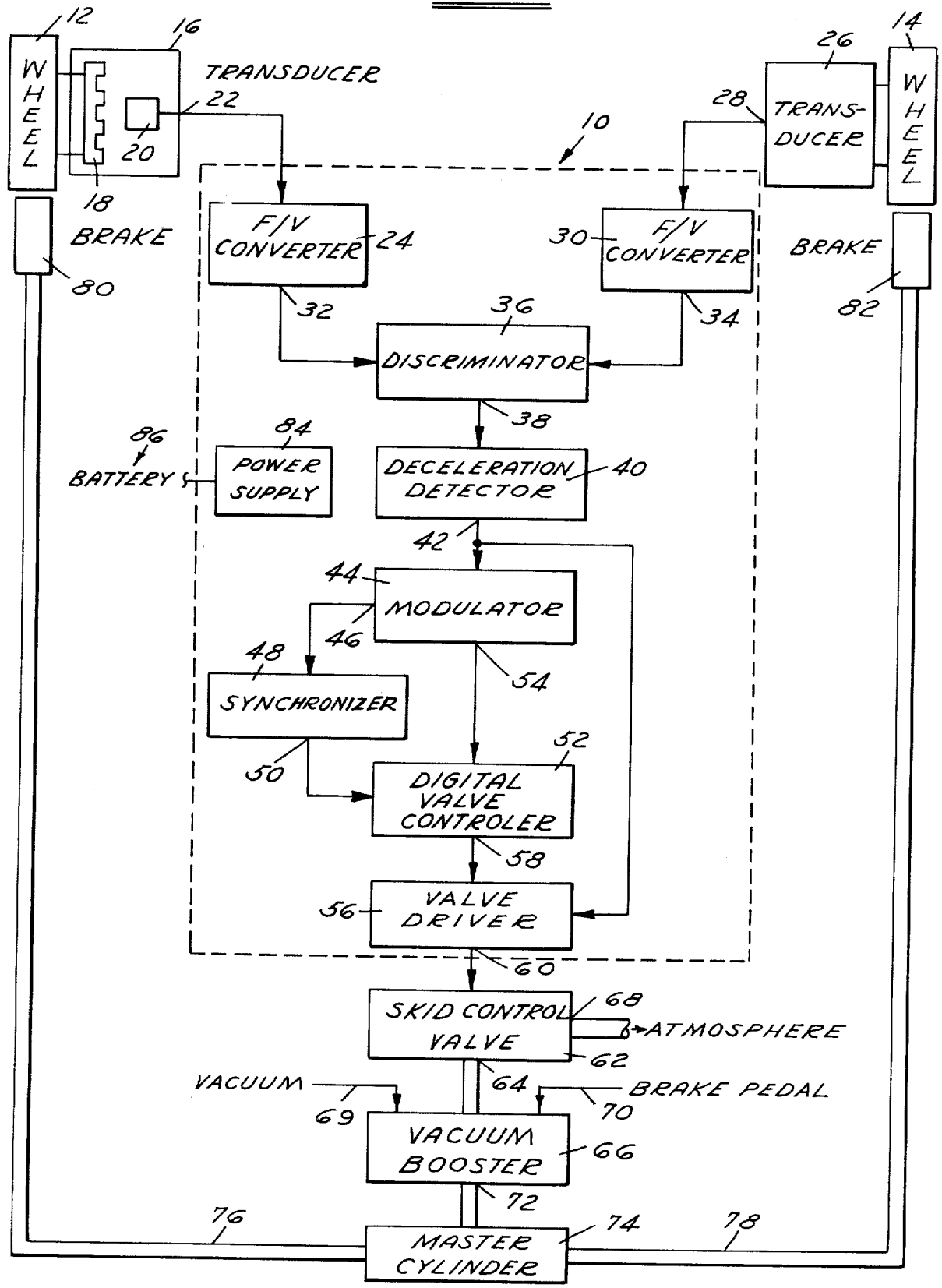
FIG. 1 is a functional block diagram of a presently preferred embodiment of the skid control system provided by the present invention.

Referring to FIG. 1, a presently preferred embodiment of the skid control circuit provided by the present invention is depicted in use with a vehicle having a pair of monitored wheels 12 and 14. A transducer 16 is associated with wheel 12 and includes a toothed wheel or exciter ring 18 attached to the hub of wheel 12 for corotation therewith. A pickup 20 is magnetically coupled to wheel 18 and is responsive to the periodic change in reluctance as the wheel rotates past the pickup to provide a sinusoidal output at 22 having a frequency proportional to the angular velocity of the associated wheel 12. Output 22 of transducer 16 is connected to skid control circuit 10 at the input of a first frequency-to-voltage converter 24. Wheel 14 has associated therewith a transducer 26 which is identical to transducer 16 and which provides an output 28 having a frequency proportional to the angular velocity of wheel 14. Transducer output 28 is connected to skid control circuit 10 at the input of a second frequency-to-voltage converter 30.

Converters 24,30 receive sinusoidal inputs from transducers 16,20 and covert the same to respective d.c. outputs 32,34, each having a voltage level proportional to the frequency of the associated input from the transducer. Converter outputs 32,34 are fed to a discriminator 36 having an output 38 which follows the lower of the two inputs, i.e., output 38 follows the d.c. output from the frequency-to-voltage converter associated with the slower moving wheel 12 or 14. Discriminator output 38 is fed to a deceleration detector 40. Deceleration detector 40 provides an output 42 which is a digital signal having a first normal level or state when the rate of change of discriminator output 38 is below a first preselected deceleration threshold and having a second state when the rate of change of discriminator output 38 exceeds the deceleration threshold.

Detector output 42 is fed to a modulator 44 which provides an output signal at 46 to a synchronizer 48. Synchronizer 48 provides an output 50 which changes from a low to a high voltage state as a function of output 42 from detector 40. Synchronizer output 50 is connected to a digital valve controller 52 which also receives an input from a second output 54 of modulator 44. A valve driver 56 has one input connected to detector output 42 and has a second input connected to an output 58 of digital valve controller 52. Valve driver 56 has an output 60, which is also the output of skid control circuit 10, connected to a conventional solenoid-operated skid control valve 62. Valve 62 has an input 64 connected to the vacuum chamber of a standard vacuum booster 66 and has an output 68 open to the atmosphere. Skid control valve 62 may be any one of the usual on-off control valve types adapted, when energized, to connect the vacuum chamber in booster 66 to atmosphere and adapted when deenergized to block such connection. Vacuum booster 66 receives a vacuum input at 69 and a second input at 70 through a mechanical linkage connected to the vehicle brake pedal, and provides a boosted output at 72 to a vehicle hydraulic master cylinder 74. Master cylinder 74 is connected by means of the usual hydraulic lines 76,78 to the brake units 80,82 associated respectively with wheels 12,14 in the usual manner. Skid control circuit 10 also includes a regulated power supply 84 which is connected to a vehicle battery 86 to provide regulated d.c. power to the other component blocks of skid control circuit 10.

Operation of skid control circuit 10 shown in FIG. 1 may be briefly outlined as follows: Deceleration detector 40 detects an excessive deceleration in the slower of the two wheels 12,14, which excessive deceleration indicates that at least the associated wheel is entering into an excessive slip or impending lock-up condition. Detector 40 provides a signal to valve driver 56 which, in turn, activates skid control valve 62 to vent the vacuum chamber in booster 66 to the atmosphere. In this manner, brake pressure at wheels 12,14, as applied thereto by the respective brake units 80,82, is substantially completely relieved. When detector 40 activates valve driver 56, a signal is provided simultaneously to modulator 44 in which a capacitive memory is charged to a predetermined level and held at that level during the duration of the excessive deceleration signal. When the excessive deceleration condition has terminated, i.e., when the slipping wheel begins to recover or spin back up to vehicle speed, the capacitor memory in modulator 44 is gradually discharged at a predetermined rate to provide declining ramp signals at modulator outputs 46, 54. Synchronizer 48 provides a steady-state high voltage or logical one signal output 50 as long as the signal at 46, representing the charge on the modulator memory capacitor, remains above a threshold level. Output 58 of digital valve controller 52 provides to valve driver 56 a periodic control signal having a predetermined frequency and having a duty cycle which varies inversely with the ramp signal at modulator output 54. The duty cycle of controller output 58 thus varies from zero to one hundred percent over the corrective control period. This variable duty cycle signal pulses skid control valve 68 and thus allows brake pressure at wheels 12,14 to be increased gradually as a function of time until the desired brake pressure determined by brake pedal input 60 is again achieved. Should an excessive deceleration or impending lock-up occur in either of the wheels 12,14 during the above-described corrective cycle, detector output 42 is reactivated to reinitiate corrective action. In a preferred embodiment of the present invention, the frequency of controller output 58 is less than eleven hertz and preferably equal to eight hertz. The duration of the control period, as determined by the capacitor discharge time at outputs 50,54, is preferably equal to about two hundred fifty milliseconds. Of course, wheel recovery time varies as a function of wheel size, among other variables; hence, the preferred discharge time of capacitor my vary in different applications.

Figure 2A:
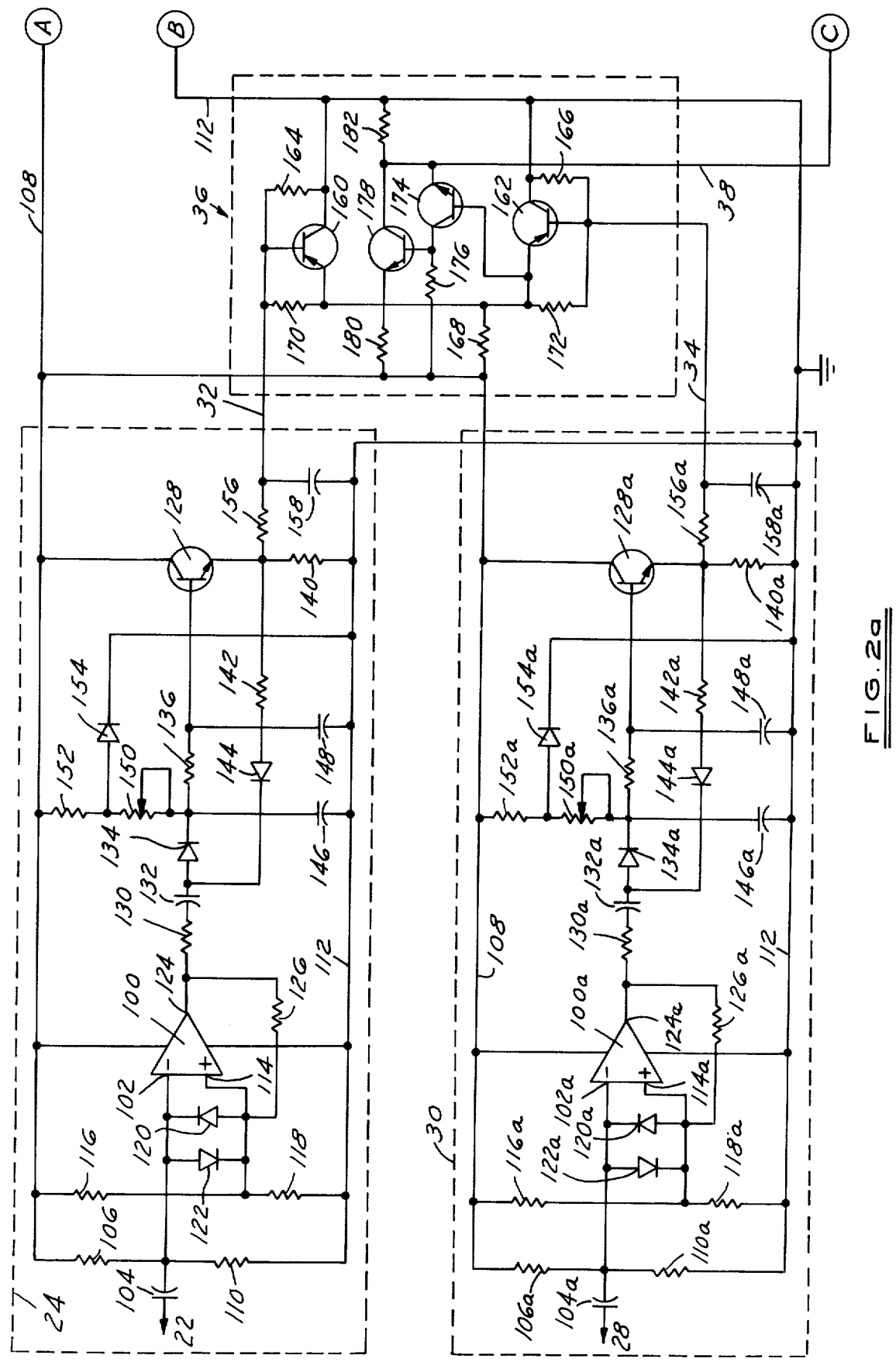
FIG. 2 (a and b) is a diagram which schematically illustrates the circuit details of the skid control system shown in FIG. 1.
Figure 2B:
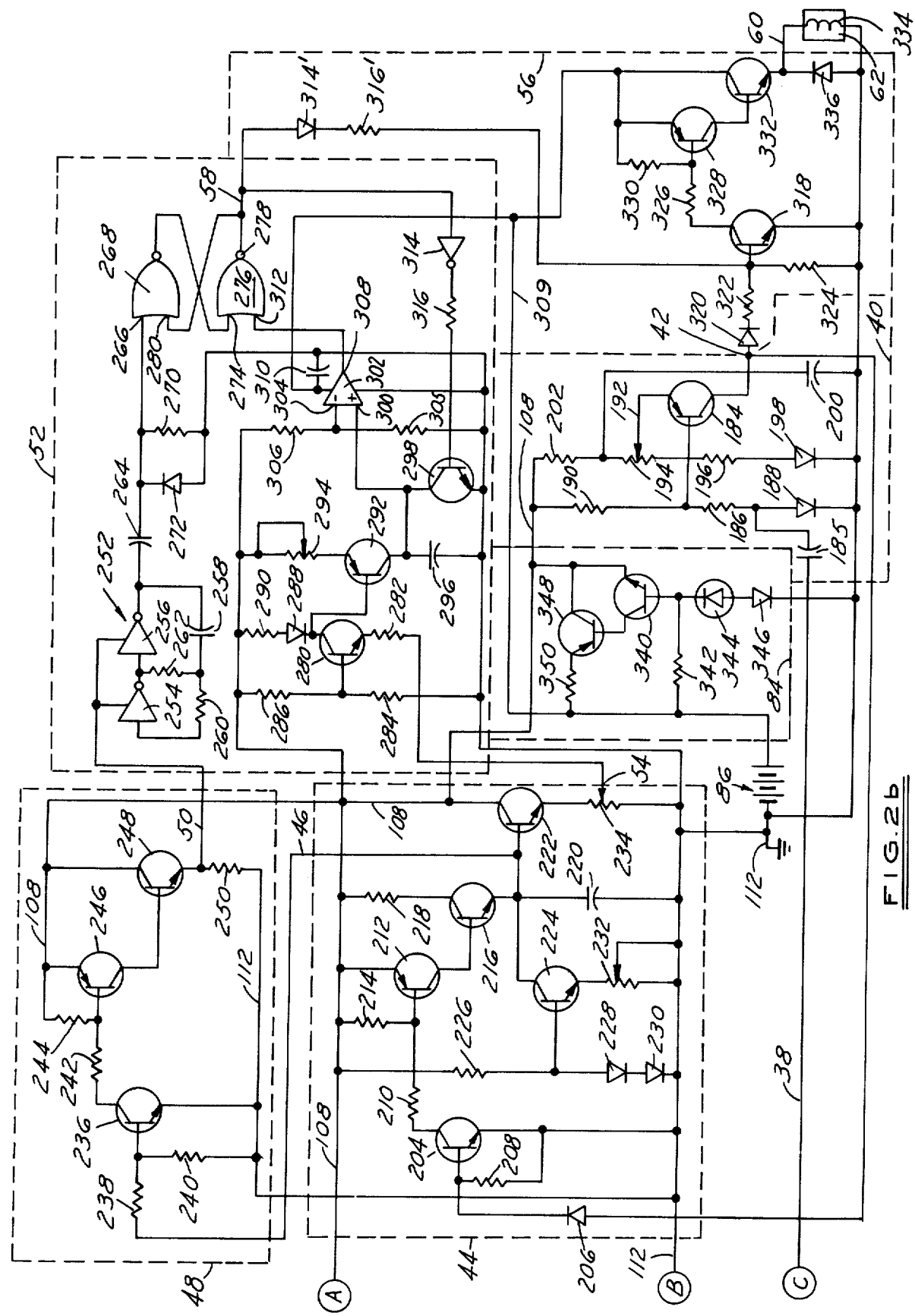

FIGS. 2a and 2b, taken together, schematically illustrate presently preferred circuit details of skid control circuit 10 shown in block form in FIG. 1. FIGS. 2a and 2b may be connected to each other by joining the respective conductor lines terminating at A, B and C in the two FIGS. Referring specifically to FIG. 2a, frequency-to-voltage converter 24 includes an operational amplifier 100 which has its inverting input 102 connected through a d.c. blocking capacitor 104 to transducer output 22. Input 102 is also connected through a resistor 106 to a voltage bus 108 and through a resistor 110 to ground 112. Voltage bus 108 and ground 112 are connected to regulated power supply 84 (FIG. 1) as will be explained in detail in connection with FIG. 2b, ground 112 also being connected to the chassis of the vehicle. The non-inverting input 114 of amplifier 100 is connected through a resistor 116 to bus 108 and through a resistor 118 to ground 112. Inputs 102,114 are also connected to each other through the parallel oppositely-poled diodes 120,122 to provide transient pulse protection for amplifier 100. The output 124 of amplifier 100, which provides a square wave signal at the frequency of the input at 102 from transducer output 22, is connected to input 114 through a resistor 126 which provides an offset voltage at input 114 to insure that self-induced switching does not occur in amplifier 100 when no signal is present at transducer output 22.

Output 124 is also connected to the base of an NPN transistor 128 through the series combination of a resistor 130, a d.c. blocking capacitor 132, the anode-cathode junction of a diode 134 and a resistor 136. The collector of transistor 128 is connected to voltage bus 108 while the emitter thereof is connected through a resistor 140 to ground 112, and also through a resistor 142 and the anode-cathode junction of a diode 144 to the anode of diode 134. Th cathode of diode 134 and the base of transistor 128 are connected to ground 112 through the respective capacitors 146,148. The cathode of diode 134 is also connected to voltage bus 108 through the series-connected resistors 150,152, resistor 150 being adjustable for factory adjustment of the gain of converter 24. The junction of resistors 150,152 is connected to ground 112 through the anode-cathode junction of a diode 154. The emitter of transistor 128 is connected to ground 112 through the series combination of a resistor 156 and a capacitor 158.

In the operation of frequency-to-voltage connector 24, each positive-going half cycle at output 124 is coupled to capacitor 146 through diode 134 and increases the charge on capacitor 146 by an amount proportional to the ratio of capacitor 146 to capacitor 132. The negative half cycle of output 124 is coupled to capacitor 146 through the base-emitter junction of transistor 128 and diode 144. The average d.c. voltage across capacitor 146 is thus directly proportional to the frequency of transducer output 22. Capacitor 146 discharges through transistor 128 and provides an output across capacitor 158, which is also the output 32 from converter 24. The charge on capacitor 158 is proportional to the voltage across capacitor 146 and, therefore, proportional to the frequency of transducer output 22. Frequency-to-voltage converter 30, which has its input connected to transducer output 28 and has an output 34, is schematically identical in both structure and operation to transducer 24 discussed above. The circuit elements of converter 30 bear the same base reference numeral as do corresponding elements of converter 24 but are distinguished therefrom by the suffix "a".

Discriminator 36 includes a pair of PNP transistors 160,162 which have their respective bases connected to converter outputs 32,34 and to ground 112 through the resistors 164,166. The emitters of transistors 160,162 are connected together to voltage bus 108 through a resistor 168 and are connected back to the respective transistor bases through the resistors 170,172. The emitters of transistors 160,162 are also connected to the base of an NPN transistor 174. The collector of transistor 174 is connected through a resistor 176 to voltage bus 108 and to the base of a second NPN transistor 178 which has its emitter connected to bus 108 through a resistor 180 and its collector connected to ground 112 through a resistor 182. The collector of transistor 178 is also connected to the emitter of transistor 174 to form output 38 of discriminator 36. The common emitter junction of transistors 160,162 closely follows the lower base voltage of the two transistors, which is to say that the common emitter junction connected to the base of transistor 174 follows the lower of the two converter outputs 32,34. The transistor 160 or 162 which is associated with the higher of the two converter outputs has its emitter-base junction reverse-biased and is turned off. The emitter follower circuit which includes transistors 174,178 has substantially unity gain so that discriminator output 38 follows the lower of the two converter outputs 32,34.

Referring now to FIG. 2b, discriminator output 38 is connected to the base of a PNP transistor 184 in deceleration detector 40 through a capacitor 185 and a resistor 186. The junction of capacitor 185 and resistor 186 is connected to ground 112 through the anode-cathode junction of a diode 188. The base of transistor 184 is connected to voltage bus 108 through a transistor 190. The emitter of transistor 184 is connected to the wiper 192 of an adjustable resistor 194 which may be factory adjusted to set the deceleration detection threshold of transistor 184 at any desired level. One terminal of adjustable resistor 194 is connected to ground 112 through a resistor 196 and the anode-cathode junction of a diode 198 while the other terminal thereof is connected to ground through a capacitor 200 and to voltage bus 108 through a resistor 202. The collector of transistor 184 forms the output 42 of detector 40.

In operation, capacitor 185 at the input of detector 40 is normally charged to a voltage determined by output 38 of discriminator 36. If an excessive slip condition does not occur during breaking and the monitored wheels 12,14 decelerate gradually, output 36 will gradually decrease and capacitor 185 will slowly discharge. During this slow discharge of capacitor 185, transistor 184 remains in its normally nonconductive state. When a rapid loss of wheel speed occurs, a rapidly dropping discriminator output 38 pulls the voltage at capacitor 185 down more rapidly than the capacitor can recharge so that the voltage at the base of transistor 184 drops, thereby turning on the transistor. Conduction of transistor 184, indicating an excessive wheel deceleration, places a high or logical one signal at output 42.

Detector output 42 is fed to the base of an NPN transistor 204 in modulator 44 through the anode-cathode junction of a diode 206. The emitter of transistor 204 is connected to ground 112 while the base thereof is connected to ground through a resistor 208. The collector of transistor 204 is connected through a resistor 210 to the base of a PNP transistor 212, and then through a resistor 214 to voltage bus 108. The emitter of transistor 212 is connected to bus 108 while the collector thereof is connected to the base of an NPN transistor 216. Transistor 216 has its collector connected to bus 108 through a resistor 218 and its emitter, which forms output 46 of modulator 44, connected through a memory capacitor 220 to ground 212, to the base of an NPN transistor 222, and to the collector of another NPN transistor 224. Transistor 224 has its base connected to bus 108 through a resistor 226 and to ground 212 through the anode-cathode junctions of a pair of series-connected diodes 228,230. The emitter of transistor 224 is connected to ground 112 through an adjustable resistor 232. Transistor 222 has its collector connected to voltage bus 108 and its emitter connected through a resistor 234 to ground 112. The wiper of adjustable resistor 234 forms output 54 from modulator 44.

When deceleration detector 40 is triggered by an excessive wheel deceleration, detector output 42 turns on normally nonconducting transistors 204,212 and 216, thereby charging capacitor 220 to a voltage which approximates that on voltage bus 108. The voltage across capacitor 220 is fed to synchronizer 48 at modulator output 46. When the impending wheel lock-up is corrected and wheel deceleration ceases, detector output 42 returns to its normal low-voltage state and transistors 204,212 and 216 turn off. However, transistor 224 is conducting since its base voltage is fixed at approximately 1.4 volts by the voltage divider consisting of resistor 226 and diodes 228, 230. Transistor 224 thus provides a constant current linear discharge path for capacitor 220 through adjustable resistor 232. Resistor 232 may be factory adjusted to provide the desired linear discharge rate for capacitor 220 and also to determine the time duration of the skid control period. As long as the charge on capacitor 220 remains above about one-half volt, buffer transistor 222 provides a ramp signal across adjustable resistor 234 which closely follows the declining voltage across capacitor 220. Resistor 234 may be factory adjusted to set the desired gain of transistor 222 at output 54.

Synchronizer 48 includes an NPN transistor 236 which has its base connected through a resistor 238 to modulator output 46 and through a resistor 240 to ground 112. The emitter of transistor 236 is connected to ground 112 while the collector thereof is connected through the series connected resistors 242,244 to voltage bus 108. The junction of resistors 242,244 is connected to the base of a PNP transistor 246 which has its emitter connected to bus 108 and its collector connected to the base of an NPN transistor 248. The collector of transistor 248 is connected to bus 108 while the emitter thereof, which forms synchronizer output 50, is connected to ground 112 through a resistor 250. The purpose of synchronizer 48 is to provide a high level d.c. voltage at output 50 when modulator 44 is turned on. When the voltage across modulator capacitor 120 is at or above approximately one volt, transistors 236,246 and 248 are saturated or fully conductive and provide a voltage at output 50 which is approximately equal to the voltage on bus 108. When capacitor 220 has discharged through transistor 224 to a level below one volt, transistors 236,246 and 248 are cut off or nonconductive so that synchronizer output 50 is low.

Digital valve controller 52 includes an oscillator 252 comprising a pair of inverters 254,256 which receive their source voltage from synchronizer output 50. The output of inverter 256 is connected through a capacitor 258 and then through a resistor 260 to the input of inverter 254 which has its output connected to the input of inverter 256. The output of inverter 254 is also connected to the junction of capacitor 258 and resistor 260 through a resistor 262. When modulator 44 is operating and a high voltage appears at synchronizer output 50, oscillator inverters 254,256 form a free running square wave oscillator having a frequency determined by capacitor 258 and resistor 262, preferably about eight hertz. When synchronizer output 50 goes low, oscillator 252 is turned off. The output of inverter 256 is fed through a capacitor 264 to one input 266 of a NOR gate 268, which input is also connected to ground 112 through the parallel combination of a resistor 270 and the cathode-anode junction of a diode 272. The output of gate 268 is connected to one input 274 of a second NOR gate 276 which has its output 278 connected to a second input 280 of gate 268. NOR gates 268,276 thus form a flip-flop which is triggered into a high or "one" state at gate output 278 by each leading or positive-going edge of the output from oscillator 252.

Digital controller 52 also includes an NPN transistor 280 which has its emitter connected through a resistor 282 to modulator output 54 and its base connected through a resistor 286 to voltage bus 108. The collector of transistor 280 is connected through the cathode-anode junction of a diode 288 and then through a resistor 290 to bus 108, and also to the base of a PNP transistor 292. The emitter of transistor 292 is connected to bus 108 through an adjustable resistor 294. The collector of transistor 292 is connected to ground 112 through a capacitor 296, to the collector of an NPN transistor 298 which has its emitter connected to ground and to the non-inverting input 300 of an operational amplifier 302.

The inverting input 304 of amplifier 302 is connected to ground 112 through a resistor 305 and to voltage bus 108 through a resistor 306. The output 308 of amplifier 302 is connected to a second input 312 of NOR gate 276. The source voltage of amplifier 302 is provided by vehicle battery 86 on a bus 309, with a capacitor 310 being connected across the power inputs of the amplifier to provide a degree of noise immunity. Gate output 278 is connected through an inverter 314 and then through a resistor 316 to the base of transistor 298.

When gate output 278 is triggered high by the leading edge of the output of oscillator 252, the base-emitter junction of transistor 298 is reverse biased by inverter 314 so that the transistor is turned off. Transistor 280 is forward biased and conductive, providing a collector voltage which is proportional to modulator output 54, i.e., proportional to the voltage across capacitor 220. With transistor 298 turned off, transistor 292 charges capacitor 296 at a rate determined by the voltage of the collector of transistor 280, i.e., determined by the charge on memory capacitor 220. Resistor 294 is factory adjusted to provide a desired charge rate at capacitor 296 for a given level at synchronizer output 54. When the charge across capacitor 296 reaches a preselected level determined by the ratio of resistors 305,306, amplifier 302 turns on providing a high or logical one signal at gate input 312 to force output 278 low. A low input to inverter 314 turns on transistor 298 so that capacitor 296 is discharged through the collector-emitter path of transistor 298. It will be evident that the duration of a high or logical one signal at gate output 278 is determined by and is, in fact, linearly and inversely proportional to the charge on modulator memory capacitor 220.

Gate output 278, which is the same as controller output 58, is fed through the anode-cathode junction of a diode 314 and then through a resistor 316 to the base of an NPN transistor 318 in valve driver 56. Detector output 42 is also connected to the base of transistor 318 through the anode-cathode junction of a diode 320 and through a resistor 322. The emitter of transistor 318 is connected directly to ground 112 while the base thereof is connected to ground through a resistor 324. The collector of transistor 318 is connected through a resistor 326 to the base of a PNP transistor 328 and then through a resistor 330 to battery voltage bus 309. The emitter of transistor 328 is connected directly to bus 309 while the collector thereof is connected to the base of an NPN transistor 332. The collector of transistor 332 is connected to bus 309 while the emitter thereof forms valve driver output 60. Valve driver 56 is connected through the solenoid 334 of skid control valve 62 to ground 112 and through the cathode-anode junction of a diode 336 to ground 112. Transistors 318,328 and 332 become conductive and apply current from vehicle battery 86 to valve coil 334, and thus relieve brake pressure at monitored wheels 12,14 (FIG. 1), upon either a high voltage level at detector output 42, i.e., when an excessive wheel deceleration is detected, or upon a high voltage level at digital valve controller output 58. Diode 336 is connected in the reverse voltage direction across coil 334 to suppress inductive ringing in the coil when transistors 318,328 and 332 turn off.

Regulated power supply 84 includes an NPN transistor 340 having a base coupled through a resistor 342 to the positive terminal of vehicle battery 86 at bus 309. The base of transistor 340 is also connected to ground 112, the negative terminal of battery 86, through a regulating zener diode 344 and the anode-cathode junction of a diode 346. The emitter of transistor 340 is connected to bus 108 while the collector thereof is connected to the base of a PNP transistor 348 which has its collector connected to bus 108 and its emitter connected through a resistor 350 to bus 309. Power supply 84 is thus powered by battery 86 to provide regulated d.c. to control circuit 10 by way of power bus 108.

Figure 3:
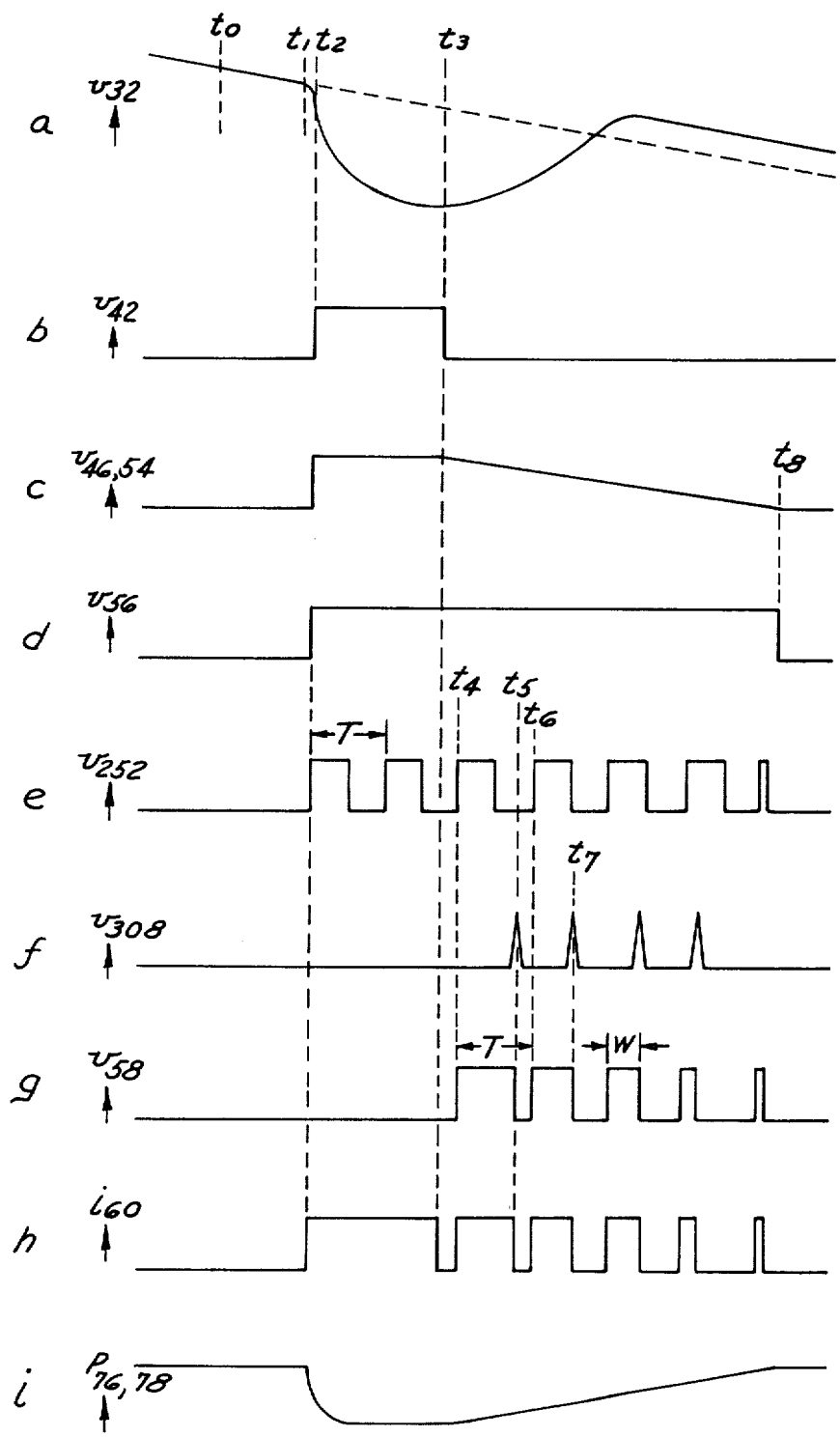
FIG. 3 is a timing diagram useful in understanding the operation of the skid control system shown in FIGS. 1 and 2.

Operation of the various circuits have been discussed individually hereinabove. The operation of the overall skid control circuit 10 shown in FIGS. 1 and 2 (a and b) will be best understood with reference to FIG. 3 which is a timing diagram of various signals appearing in the skid control system of FIG. 1 and which is not necessarily to scale. Graphs a–h in FIG. 3 respectively depict waveforms representing output signals at 32,42,46 (54), 250,252,58 and 60 of FIGS. 1 and 2, which waveforms have been selected for the purpose of explaining the present invention. The ordinates of graphs a–g are in units of voltage. Graph h has an ordinate in units of current. Graph i illustrates the hydraulic brake pressure in conduits 76,78 of FIG. 1 and therefore has an ordinate in units of pressure. The abscissa of FIG. 3 is common to graphs a–i and is in units of time. It will be understood that time delays which are inherent to the component shown in FIGS. 1 and 2 but which are not relevant to the operation of the invention are not shown in FIG. 3.

Referring to FIG. 3, at time $t_o$ brake pressure has already been applied as shown at graph i by means of the vehicle operator brake pedal and linkage 70 (FIG. 1), and the velocity of wheel 12 is already gradually decreasing to provide a decreasing signal at converter output 32 as shown at graph a. Looking closely at graph a, at time $t_1$ wheel 12 enters upon a road surface having a low coefficient of friction causing the velocity of the wheel to decrease rapidly and output 32 to drop suddenly. At time $t_2$, which may be as little as ten milliseconds after time $t_1$, the velocity of wheel 12 is dropping, i.e., wheel 12 is decelerating, at a rate which activates deceleration detector 40 to provide a detector output 42 shown in graph b. Current is applied at output 60 to valve solenoid 334 as shown in graph h, and brake pressure at wheels 12,14 is substantially relieved as depicted in graph i. At the same time, detector output 42 activates modulator 44 so that capacitor 220 (FIG. 2b) is charged to provide modulator outputs 46 and 54 depicted in graph c. It will be recognized that, although outputs 46 and 54 may not be identical, the two outputs have substantially identical waveshapes so that they may be represented by the single waveform indicated in graph c for purposes of illustration. Synchronizer 48 provides an output 50 to oscillator 252 (FIG. 2b) as depicted in graph d.

With brake pressure relieved, the deceleration of wheel 12 decreases from time $t_2$ to time $t_3$, and at time $t_3$ wheel deceleration is zero indicating that wheel 12 will begin to recover or speed back up to the speed of the vehicle. At this time, deceleration detector 40 and valve driver 56 turn off as indicated in graphs b and h respectively. Referring to graph e, oscillator 252 has been operating at fixed frequency (1/T) since time $t_2$ when an excessive deceleration was first detected and synchronizer 48 was first activated. On the first positive-going edge of the square wave output from oscillator 252 after wheel deceleration has terminated, i.e., at time $t_4$ in graph e, the flip-flop comprising NOR gates 268 and 276 (FIG. 2b) is set, thereby providing a positive or high valve controller output 58 as shown in graph g. At this time, transistor 298 (FIG. 2b) is turned off and capacitor 296 is allowed to charge by conduction of transistor 280. Since the voltage at modulator output 54 is still relatively high, as indicated in graph c, the collector of transistor 280 (FIG. 2b) is fairly high so that transistor 292 is only slightly conductive and capacitor 296 is charged slowly. At time $t_5$ in FIG. 3, the voltage on capacitor 296 (FIG. 2b) exceeds the voltage across resistor 305 so that amplifier output 308 goes high, as indicated in graph f, and digital controller output 58 goes low. The low condition of output 58 causes transistor 298 to conduct so that capacitor 296 is rapidly discharged. Output pulse 308 is thus fairly narrow and has a pulse duration equal to the delay times of gate 276, inverter 314, transistor 298 and amplifier 302. On the next positive-going edge of oscillator output 252 at time $t_6$, controller output 58 again goes high to activate valve driver 56. By this time modulator capacitor 220 has had a chance to discharge to a lower level so that controller transistor 280 is conducting more current and places a lower voltage at the base of transistor 292. Capacitor 296 is thus charged more rapidly than during the first cycle described above, so that output pulse 308 occurs at a time $t_7$ which is closer to time $t_6$ than was time $t_5$ to time $t_4$. Thus, flip-flop 268,276 is periodically set at a frequency of 1/T and is reset in each cycle T at a time inversely proportional to the voltage on modulator capacitor 220. For this reason, the frequency of controller output 58 and driver output 60 remains constant at 1/T while the width W of the individual pulses at outputs 58,60 decreases with time. Thus, the duty cycle of skid control valve 62, which is the inverse of graph h, increases with time over the control cycle between zero prior to time $t_3$ and one hundred percent after time $t_8$, at which time the charge on capacitor 220 reaches zero and the control cycle is terminated.

Although skid control system 10 (FIGS. 1 and 2) provided by the present invention has been described hereinabove in connection with a vehicle having a master cylinder 74 which services two brake units 80,82, it will be evident that the present invention is equally applicable to a vehicle wherein only one wheel or wherein three or more wheels are associated with each master cylinder. In the case wherein only one wheel is to be monitored, one of the transducers 16,26 and the frequency-to-voltage converters 24,30, as well as the discriminator 36, may be eliminated with the output of the remaining voltage-to-frequency converter connected directly to the input of the deceleration detector 40. In the case wherein three or more wheels are to be monitored, an additional tranducer identical to transducers 16,26 and an additional frequency-to-voltage identical to converters 24,30 may be added for each additional wheel. Discriminator 36 may be expanded to accomodate any number of inputs from additional frequency-to-voltage converters by merely adding in parallel with transistors 160,162 (FIG. 2a) additional buffer circuits, each comprising a transistor 160 and resistors 164, 170. Additional alternatives, modifications and variations to the embodiment herein described will suggest themselves to persons skilled in the art in view of the foregoing description. The present invention is intended to embrace all such alternatives, modifications and variations as fall within the spirit and broad scope of the appended claims.

The invention claimed is:

1. In a wheeled vehicle having a vacuum-boosted hydraulic brake system, the method of controlling braking of said vehicle in accordance with performance of a selected braked wheel comprising the steps of (a) monitoring performance of said wheel to provide a control signal when performance of said wheel indicates an impending wheel lock-up condition, (b) substantially relieving brake pressure at said monitored wheel in response to said control signal, and (c) gradually reapplying brake pressure at said monitored wheel as a preselected function of time over a predetermined control cycle time independently of said wheel performance in the absence of said control signal.

2. The method set forth in claim 1 wherein said vacuum-boosted brake system includes a vacuum booster with a vacuum chamber and a solenoid-operated skid control valve adapted to selectively vent said vacuum chamber to atmosphere, and wherein said step of gradually reapplying brake pressure comprises the step of periodically energizing said valve solenoid with a signal having a fixed frequency and a duty cycle which increases over said predetermined control cycle time.

3. The method set forth in claim 2 wherein said duty cycle increases from zero to one hundred percent over said control cycle time.

4. In the combination comprising a brake control circuit and a wheeled vehicle brake system characterized by a slow system response time as compared to the time required to generate a control signal in said circuit, the improvement in said control circuit comprising means monitoring performance of at least one wheel of said vehicle during braking to develop a control signal when performance of said wheel indicates an impending lock-up of said wheel, means substantially relieving brake pressure at said at least one wheel in response to said control signal and means gradually reapplying brake pressure at said wheel as a predetermined function of time over a predetermined control cycle time independently of said wheel performance in the absence of said control signal.

5. The combination set forth in claim 4 wherein said control signal is a first control signal, said brake system is of the type having a vacuum-boosted hydraulic brake system including a vacuum booster with a vacuum chamber and a skid control valve adapted to selectively vent said vacuum chamber at atmosphere in response to control signals, said wheel monitoring means comprises means responsive to said wheel to develop said first control signal as a function of the velocity of said wheel, said brake pressure relieving means comprises first means operatively connected to said wheel responsive means to provide a second control signal to said skid control valve to vent said chamber to atmosphere when said wheel velocity decreases at a rate which exceeds a first predetermined threshold such that brake pressure at said wheel is substantially relieved, said first means further including means responsive to said first control signal to terminate said second control signal when said wheel velocity begins increasing, and wherin said brake pressure reapplying means comprises second means responsive to said first control signal to provide a third control signal to said valve periodically to vent said chamber to atmosphere when said wheel velocity begins increasing, said third control signal being independent of said wheel velocity in the absence of a subsequent impending lockup of said wheel, and having a fixed frequency and having a duty cycle which increases as a function of time independently of wheel velocity from zero to one hundred percent over a predetermined fixed control cycle time such that brake pressure is increased gradually at said wheel over said cycle time to a preselected maximum brake pressure.

6. The combination set forth in claim 5 wherein said duty cycle increases as a linear function of time independently of wheel velocity.

7. The combination set forth in claim 6 wherein said first means comprises means responsive to the deceleration of said at least one vehicle wheel to provide a first condition of said first control signal when said wheel deceleration exceeds a preselected threshold and to provide a second condition of said first control signal when wheel deceleration is substantially equal to zero.

8. The combination set forth in claim 7 wherein said second means comprises an oscillator responsive to said first condition of said first control signal to generate a periodic signal at fixed frequency and duty cycle, a ramp function generator responsive to said second condition of said first control signal to generate a ramp signal which varies between preselected limits over said control cycle time, and a controller responsive to a said periodic signal and to said ramp signal to generate said third control signal having a frequency determined by said periodic signal and a duty cycle which varies as a function of said ramp signal.

9. The combination set forth in claim 8 wherein said generator includes a memory capacitor charged to a preselected voltage level in response to said first condition of said first control signal and means discharging said capacitor at a preselected fixed rate in response to said second condition of said first control signal, said ramp signal being generated according to decreasing charge on said capacitor.

10. The combination set forth in claim 5 wherein a plurality of vehicle wheels are monitored, said wheel responsive means developing signals which vary as a function of the velocity of each of said plurality of wheels, and wherein said control system further comprises means selecting a one of said wheel velocity signals associated with the slowest moving wheel to develop said first control signal.

11. The combination set forth in claim 10 wherein said first and second means control brake pressure at all of said plurality of monitored wheels substantially simultaneously.

12. The combination set forth in claim 5 wherein said skid control valve is solenoid operated, and wherein said control system further comprises means selectively energizing said valve solenoid in response to said first and second control signals.

13. The combination set forth in claim 5 wherein said duty cycle increases substantially linearly over said predetermined cycle time.

14. The combination set forth in claim 13 wherein said cycle time is substantially equal to two hundred fifty milliseconds.

15. The combination set forth in claim 5 wherein said fixed frequency is less than eleven hertz.

16. The combination set forth in claim 15 wherein said fixed frequency is substantially equal to eight hertz.

17. A skid control system for wheeled vehicles equipped with brakes at at least one vehicle wheel comprising means responsive to said wheel to provide a signal which varies as a function of rotation of said wheel, means operatively connected to said wheel responsive means to provide a first control signal when deceleration of said wheel exceeds a predetermined threshold, means including brake actuating means operatively connected to said brakes and responsive to said first control signal to release said brakes at said wheel substantially completely such that said wheel begins to spin back up to vehicle speed, means operatively connected to said wheel responsive means to disable said first control signal and to provide a pulsed second control signal as velocity of said wheel increases, and means including said brake actuating means operatively connected to said brakes and responsive to said pulsed second control signal to increase braking at said wheel over a predetermined fixed cycle time to a preselected maximum value, said pulsed second control signal having a fixed frequency and having a duty cycle which increases over a predetermined range during said predetermined fixed cycle time independently of wheel rotation, said predetermined duty cycle range and said predetermined fixed cycle time each being substantially the same during each occurrence of said second control signal.

* * * * *